US009784129B2

(12) United States Patent
Eleftheriou et al.

(10) Patent No.: US 9,784,129 B2
(45) Date of Patent: Oct. 10, 2017

(54) REAR MOUNT ASSEMBLY FOR GAS TURBINE ENGINE (71) Applicant: Pratt & Whitney Canada Corp., Longueuil (CA)

(72) Inventors: Andreas Eleftheriou, Woodbridge (CA); Bryan Olver, Nobleton (CA); Carmen Alecu, Brampton (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 687 days.

(21) Appl. No.: 14/449,507

(22) Filed: Aug. 1, 2014

(65) Prior Publication Data
US 2016/0032837 A1 Feb. 4, 2016

(51) Int. Cl.
  *F01D 25/16* (2006.01)
  *F02C 7/20* (2006.01)
  *F02K 3/06* (2006.01)
  *B64D 27/26* (2006.01)

(52) U.S. Cl.
  CPC ...... *F01D 25/162* (2013.01); *B64D 2027/262* (2013.01); *F02C 7/20* (2013.01); *F02K 3/06* (2013.01); *Y02T 50/672* (2013.01)

(58) Field of Classification Search
  CPC . F01D 25/28; F01D 25/162; B64D 2027/268; B64D 2027/262; B64D 2027/264; F02C 7/20; F02K 3/06
  See application file for complete search history.

(56) References Cited

U.S. PATENT DOCUMENTS

| 3,397,855 | A | | 8/1968 | Newland |
| 4,478,551 | A | | 10/1984 | Honeycutt, Jr. et al. |
| 4,683,717 | A | * | 8/1987 | Naud ............... B64D 29/08 60/226.1 |
| 4,979,872 | A | | 12/1990 | Myers et al. |
| 5,076,049 | A | | 12/1991 | Von Benken et al. |
| 5,088,279 | A | | 2/1992 | MacGee |
| 5,860,623 | A | | 1/1999 | Dunstan et al. |
| 6,328,293 | B1 | | 12/2001 | Olsen |
| 8,313,293 | B2 | | 11/2012 | Heyerman et al. |
| 8,567,202 | B2 | | 10/2013 | Heyerman et al. |
| 8,596,603 | B2 | * | 12/2013 | Gallet ............... F01D 25/162 244/53 R |

(Continued)

Primary Examiner — William H Rodriguez
(74) Attorney, Agent, or Firm — Norton Rose Fulbright Canada (57) ABSTRACT A gas turbine engine with a rear mount assembly including link rods interconnecting the bypass duct wall and the core portion and connecting assemblies connected to the bypass duct wall. Each connecting assembly has inner and outer surfaces bordering an opening through which an outer end of a respective link rod extends. The outer surface is accessible from outside the bypass duct wall. A first locking member is engaged to the outer end in a first locked position, and includes an abutment portion located radially inwardly of the inner surface and abutting the inner surface, and an outer portion protruding radially outwardly through the opening beyond the outer surface. A second locking member is engaged the outer end in a second locked position, and has an abutment portion located radially outwardly of the outer surface and abutting the outer surface. A method of supporting a core portion is also discussed.

20 Claims, 6 Drawing Sheets (56) References Cited

U.S. PATENT DOCUMENTS

| | | | |
|---|---|---|---|
| 8,979,491 B2* | 3/2015 | Heyerman | B64D 27/20 |
| | | | 248/554 |
| 9,068,476 B2* | 6/2015 | Caulfeild | F01D 25/28 |
| 9,121,347 B2* | 9/2015 | Bellabal | F01D 21/045 |
| 9,194,296 B2* | 11/2015 | Vrljes | F02C 7/20 |
| 9,206,766 B2* | 12/2015 | Clemen | F01D 25/162 |
| 9,217,337 B2 | 12/2015 | Sandy et al. | |
| 9,267,435 B2 | 2/2016 | Heyerman et al. | |
| 2010/0290903 A1* | 11/2010 | Heyerman | B64D 27/26 |
| | | | 415/213.1 |
| 2012/0222396 A1* | 9/2012 | Clemen | F02K 3/06 |
| | | | 60/226.1 |
| 2013/0014515 A1* | 1/2013 | Bellabal | F01D 21/045 |
| | | | 60/797 |
| 2013/0164126 A1* | 6/2013 | Caulfeild | F01D 25/28 |
| | | | 415/213.1 |
| 2013/0195640 A1* | 8/2013 | Grede | F01D 25/24 |
| | | | 415/208.1 |
| 2013/0309070 A1* | 11/2013 | Vrljes | F02C 7/20 |
| | | | 415/144 |
| 2014/0047849 A1* | 2/2014 | Kramer | F02K 1/80 |
| | | | 60/796 |
| 2014/0090399 A1* | 4/2014 | McAlice | F02K 1/82 |
| | | | 60/796 |
| 2014/0093369 A1* | 4/2014 | McAlice | F01D 25/14 |
| | | | 415/213.1 |
| 2015/0354412 A1* | 12/2015 | Preston | F01D 25/28 |
| | | | 60/796 |
| 2016/0032837 A1 | 2/2016 | Eleftheriou et al. | |
| 2016/0108817 A1 | 4/2016 | Bagnall | |

* cited by examiner

REAR MOUNT ASSEMBLY FOR GAS TURBINE ENGINE

TECHNICAL FIELD

The application relates generally to gas turbine engines and, more particularly, to mount assemblies for turbofan engines.

BACKGROUND OF THE ART

Turbofan engines usually include a core portion mounted inside a bypass duct. Known engine mount systems include a front mount assembly reacting to thrust, lateral and vertical loads, and a rear mount assembly reacting to lateral and vertical loads. The rear mount assembly may include a plurality of link rods extending across the bypass air passage. Known systems include an adjustable connection of the link rods with the core portion of the engine. However the position of the adjustment mechanism may make adjustment subsequent to assembly relatively difficult.

SUMMARY

In one aspect, there is provided a gas turbine engine comprising: a core portion received within an annular bypass duct wall, a bypass air passage being defined by an annular space between the core portion and bypass duct wall; a front mount assembly supporting the core portion in proximity of an inlet of the bypass air passage; a rear mount assembly supporting the core portion in proximity of an outlet of the bypass air passage, the rear mount assembly including: a plurality of link rods interconnecting the bypass duct wall and the core portion to form a load transfer path therebetween; a plurality of connecting assemblies, each connecting assembly being connected to the bypass duct wall, each connecting assembly having: an inner surface facing radially inwardly and an outer surface located radially outwardly of the inner surface and facing radially outwardly, both the inner and outer surfaces bordering an opening through which an outer end of a respective one of the link rods extends, the outer surface being accessible from outside of the bypass duct wall, a first locking member engaged to the outer end in a first locked position, the first locking member including a first abutment portion located radially inwardly of the inner surface and abutting the inner surface, the first locking member having an outer portion protruding radially outwardly through the opening beyond the outer surface, and a second locking member engaged to the outer end in a second locked position, the second locking member having a second abutment portion located radially outwardly of the outer surface and abutting the outer surface.

In another aspect, there is provided a rear mount assembly for a gas turbine engine, the assembly comprising: a plurality of connecting assemblies each including a bracket sized to be received in a respective one of a plurality of holes defined through a bypass duct wall of the gas turbine engine, each bracket including an engagement wall having an opening defined therethrough; for each bracket, a first link rod having an outer end received through the opening, the first link rod extending radially inwardly from the bracket; and each of the connecting assemblies including: a first locking member engaged to the outer end of the first link rod, the first locking member having a first abutment portion located radially inwardly of the engagement wall, the first abutment portion abutting an inner surface of the connecting assembly to prevent a radially outward movement of the outer end, the first locking member having an outer portion protruding radially outwardly of the engagement wall through the opening; and a second locking member engaged to the outer end, the second locking member having a second abutment portion located radially outwardly of the engagement wall, the second abutment portion abutting an outer surface of the connecting assembly to prevent a radially inward movement of the outer end.

In a further aspect, there is provided a method of supporting a core portion within a bypass duct wall of a gas turbine engine, the method comprising: engaging an inner end of each of a plurality of link rods to the core portion and engaging a first locking member to an outer end of each of the link rods; inserting the outer end of each of the link rods through a respective opening of a connecting assembly of the bypass duct wall from inside of the bypass duct wall, the first locking member having an abutment portion larger than the respective opening and an outer portion protruding radially outwardly from the respective opening; from outside of the bypass duct wall, manipulating each first locking member by the outer portion to adjust a position of each first locking member until the abutment portion of each first locking member abuts an inner surface of the connecting assembly defined around the respective opening and the core portion has a desired position within the bypass duct wall, and locking the position of the first locking member; and from outside of the bypass duct wall, engaging a second locking member to the outer end of each of the link rods and moving each second locking member radially inwardly until each second locking member abuts an outer surface of the connecting assembly defined around the respective opening, and locking a position of the second locking member.

DESCRIPTION OF THE DRAWINGS

Reference is now made to the accompanying figures in which.

DETAILED DESCRIPTION

Figure 1:
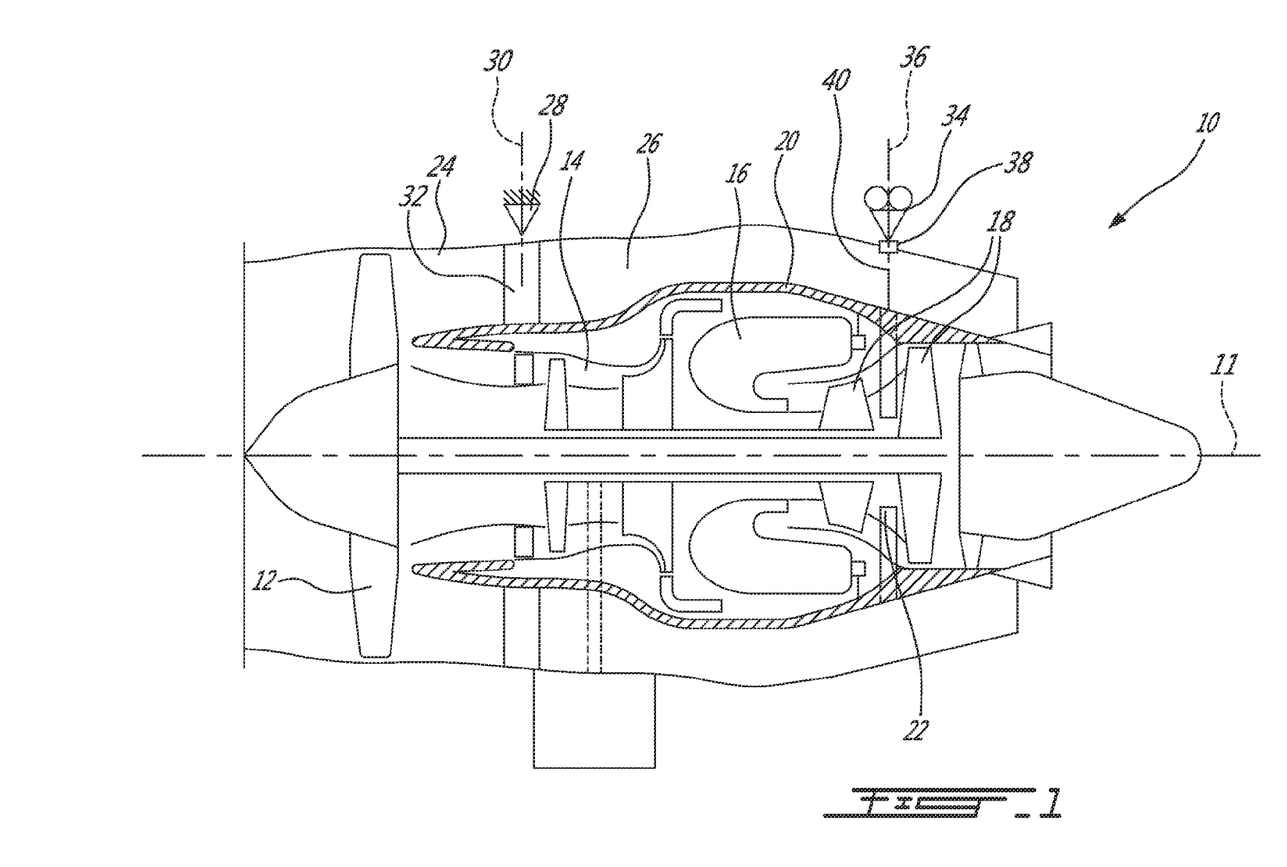
FIG. 1 is a schematic side cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

A core portion 20 surrounds the compressor section 14 and turbine section 18, to define a main fluid path in which the combustor 16 is contained. The core portion 20 includes an annular mid turbine frame 22 which is disposed between high and low pressure assemblies of the turbine section 18. The core portion 20 is coaxially positioned within an annular bypass duct wall 24 which also surrounds the fan 12, and an annular bypass air passage 26 is defined radially between the annular bypass duct wall 24 and the core portion 20 of the engine for directing a bypass air flow driven by the fan assembly 12 to pass therethrough.

A front mount assembly 28 is attached to the annular bypass duct wall 24 at a front axial position indicated by line 30 (representing a front mounting plane) located close to an inlet of the annular bypass air passage 26, to mount the engine to an aircraft (not shown). Radial struts 32 are provided near the axial location of the front mount plane 30 and extend between the bypass duct wall 24 and the core portion 20 to support the core portion 20 within the bypass duct wall 24, transferring thrust, lateral and vertical loads to the front mount assembly 28.

A rear mount assembly 34 is also attached to the annular bypass duct wall 24 at a rear axial position indicated by line 36 (representing a rear mounting plane), close to an outlet of the bypass air passage 26.

Figure 2:
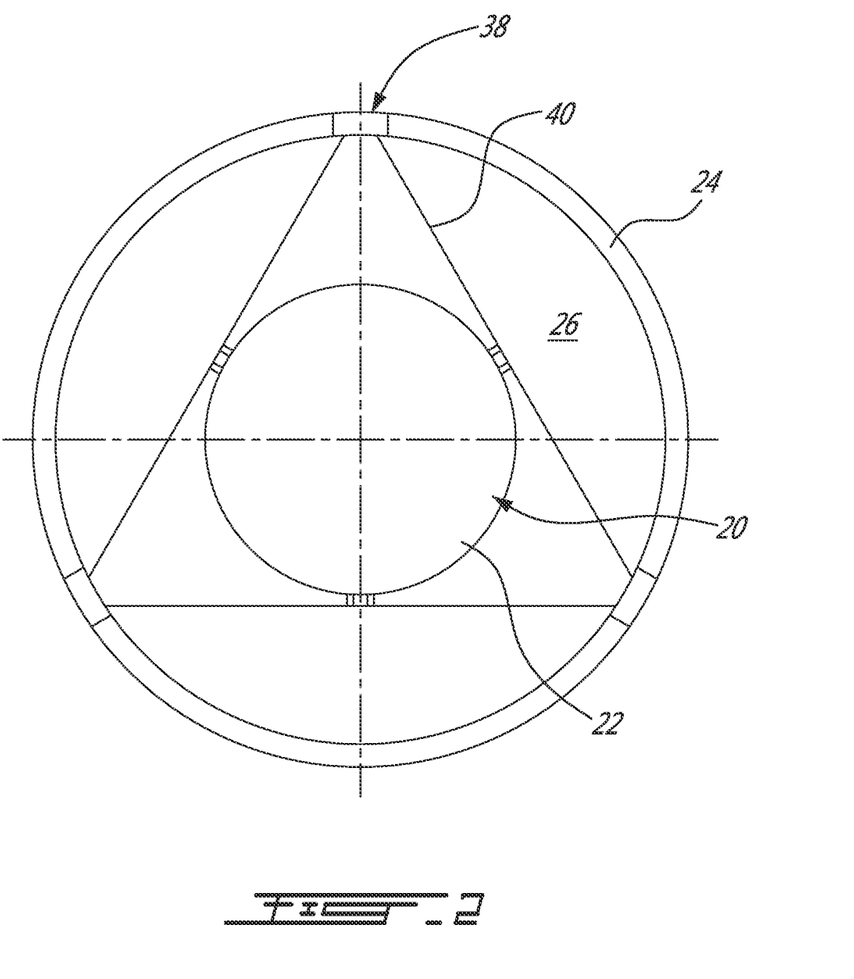
FIG. 2 is a schematic front cross-sectional view of part of a rear mount assembly of a gas turbine engine such as shown in FIG. 1, in accordance with a particular embodiment.

Referring to FIG. 2, the rear mount assembly 34 includes a plurality of circumferentially spaced apart connecting assemblies 38 which are attached to the bypass duct wall 24, and a plurality of link rods 40 extending across the annular bypass air passage 26. In the embodiment shown, the link rods 40 extend substantially tangentially to the core portion 20 of the engine, and six (6) link rods 40 are provided for interconnecting three points on the core portion 20 with three points on the bypass duct wall 24 such that each point on the core portion 20 is connected with two points on the bypass duct wall 24, and each point on the bypass duct wall 24 is connected to two points on the core portion 20. Other configurations and/or numbers of link rods are also possible. Each link rod 40 is connected at the outer end thereof to the bypass duct wall 24 through one of the connecting assemblies 38 and is attached at the inner end thereof to the core portion 20. The tangential link rods 40 form a short circuit across the annular bypass air passage 26 to transfer the core portion related inertia-induced loads from the core portion 20 to the connecting assemblies 38 and the bypass duct wall 24. The link rods 40 thus transfer lateral and vertical loads to the rear mount assembly 34.

In the embodiment shown, the link rods 40 are attached to the mid turbine frame 22 of the core portion 20. In other embodiments, the link rods 40 may be attached to other elements of the core portion 20, including, but not limited to, an exhaust case or another turbine case. Although not shown, each of the link rods 40 may have an aerodynamic profile in cross-section; alternately or in addition, each link rod may have a hollow configuration.

Figure 3:
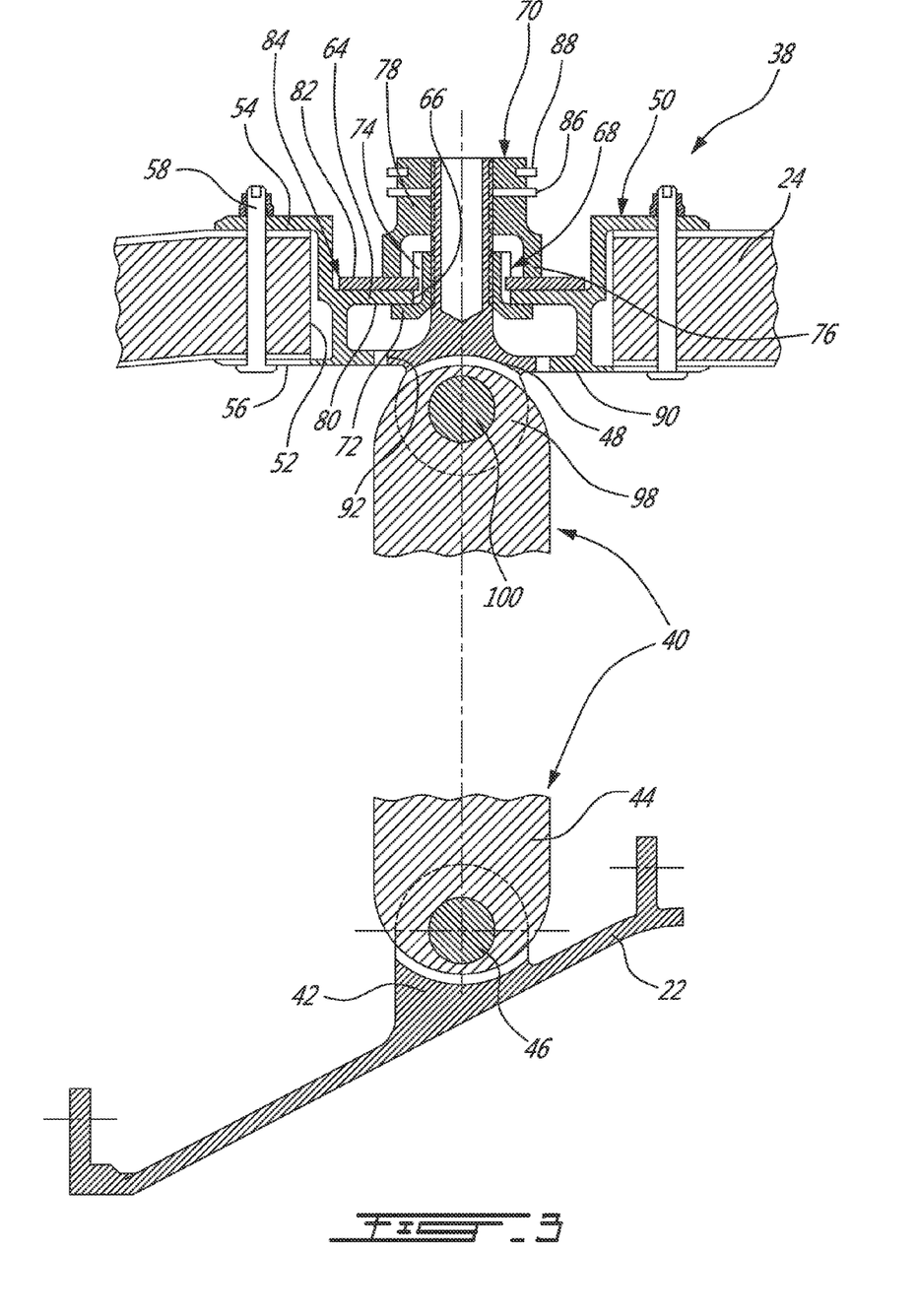
FIG. 3 is a schematic side cross-sectional view of a connecting assembly and link rod of a rear mount of a gas turbine engine, in accordance with a particular embodiment.

Referring to FIG. 3, in a particular embodiment, the mid turbine frame 22 includes a clevis 42 engaging the inner end 44 of each link rod 40, the inner end 44 and clevis 42 having aligned holes defined therethrough through which a bolt 46 is received to define a pivot connection. Other types of connections and other configurations are also possible.

In a particular embodiment, each connecting assembly 38 includes a bracket 50 which is received in a corresponding hole 52 defined through the bypass duct wall 24. The bracket 50 may be made of a different material than that of the bypass duct wall 24; for example, the bracket 50 may be made of an appropriate type of metal such as aluminum or titanium, while the bypass duct wall 24 may be made of an appropriate type of composite. Alternate materials are also possible.

The bracket 50 is connected to the bypass duct wall 24. In the embodiment shown, this connection is provided by outer and inner flanges 54, 56 of the bracket 50 between which the bypass duct wall 24 extends, and a plurality of fasteners 58, for example rivets, interconnecting the outer and inner flanges 54, 56 through the bypass duct wall 24. Alternate types of connections are also possible.

Figure 4:
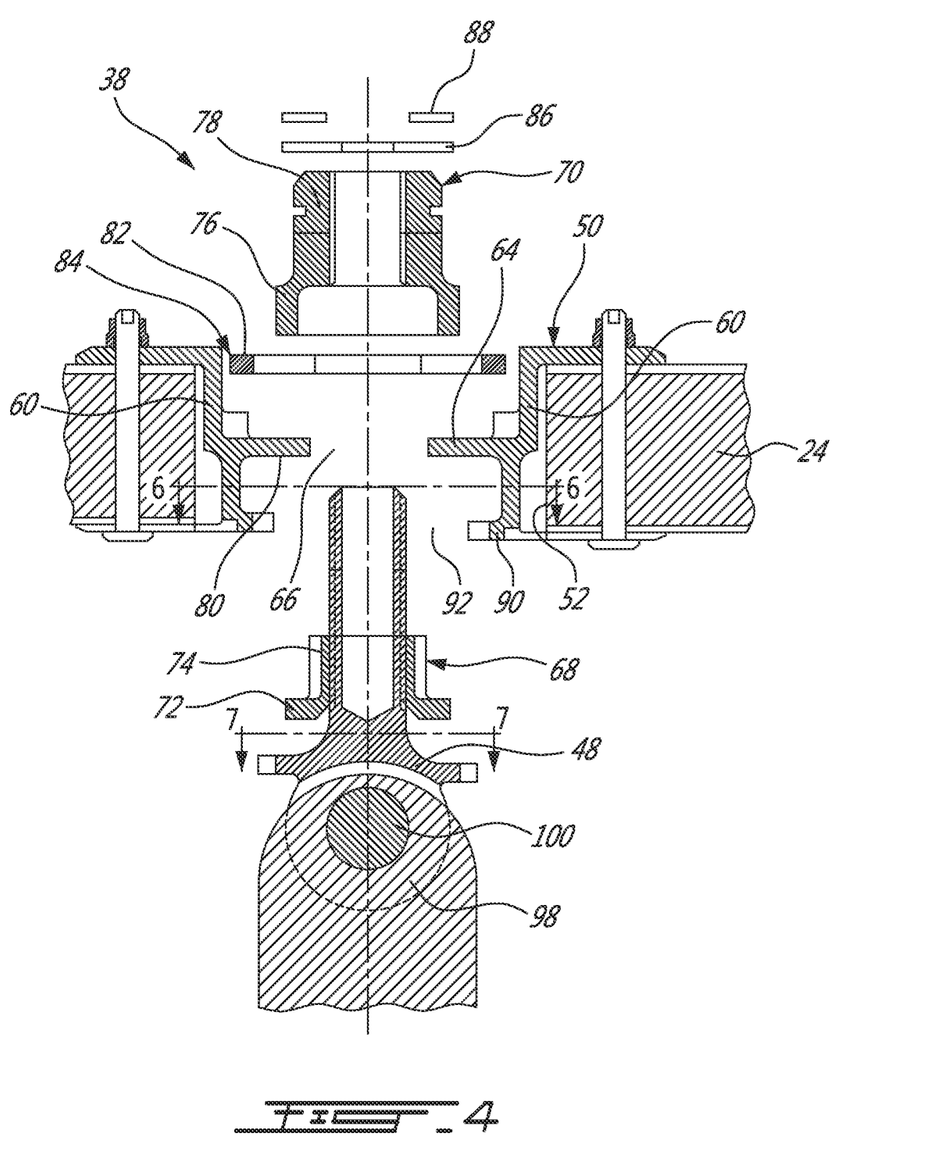
FIG. 4 is a schematic, exploded, side cross-sectional view of the connecting assembly and link rod of FIG. 3.
Figure 5:
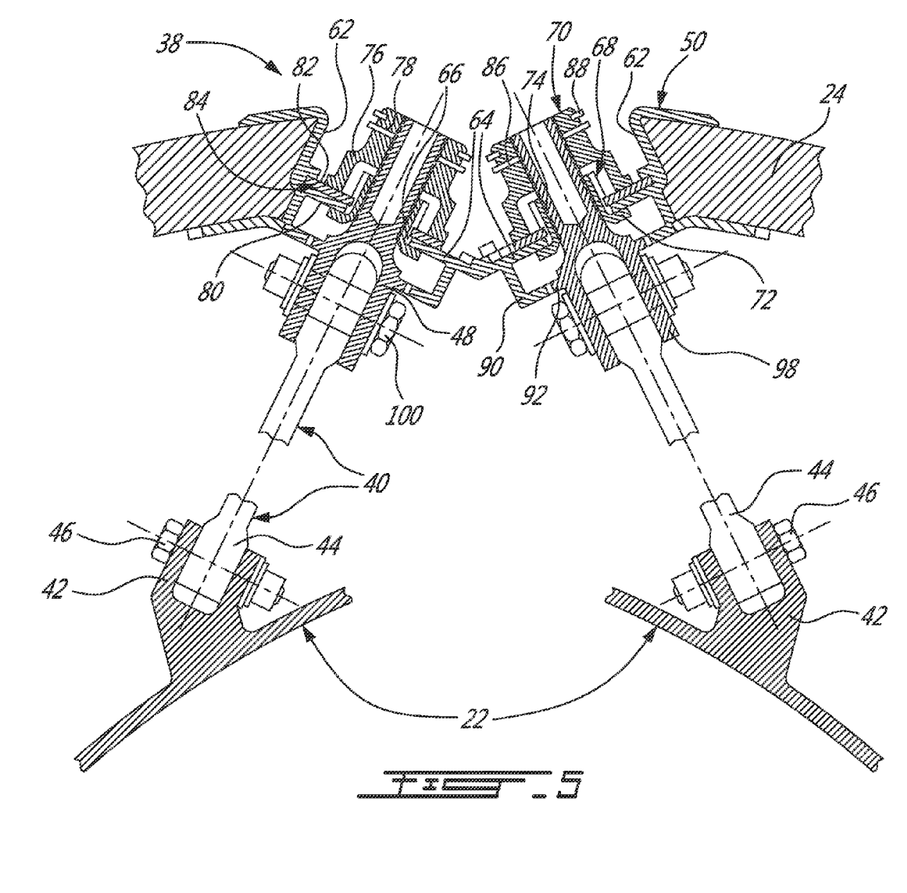
FIG. 5 is a schematic front cross-sectional view of the connecting assembly and link rod of FIG. 3 in accordance with a particular embodiment, showing another link rod engaged to the connecting assembly.

In the embodiment shown and as can be seen in FIGS. 4-5, the bracket 50 includes front and rear walls 60 (FIG. 4) interconnected by side walls 62 (FIG. 5) to define a perimeter received within the hole 52 of the bypass duct wall 24. Two engagement walls 64 having different orientations from one another both extend axially between the front and rear walls 60. Each engagement wall 64 extends circumferentially from its respective side wall 62 to a connection between the two engagement walls 64. The engagement walls 64 are inclined when viewed from the front of the engine (FIG. 5) such as together define a V-shape symmetrical about the connection between the engagement walls 64. Each engagement wall 64 has an opening 66 defined therethrough, through which the outer end 48 of a respective link rod 40 extends. Each bracket 50 thus engages two link rods 40 extending toward the core portion 20 in different directions both tangential to the core portion 20.

Each connecting assembly 38 also includes two locking members 68, 70 engaged in respective locked positions to the outer end 48 of each link rod 40. In the embodiment shown, the outer end 48 includes external threads, and each locking member 68, 70 is a threaded nut including internal thread such as to be threadingly engaged to the outer end 48. Alternate types of locking members are also possible.

As can be best seen in FIG. 3, the inner locking member 68 includes an abutment portion 72 which is larger than the bracket opening 66 such that it cannot pass therethrough. The abutment portion 72 is located radially inwardly of the engagement wall 64. The inner locking member 68 also includes an outer portion 74 extending radially outwardly from the abutment portion 72, and protruding radially outwardly of the engagement wall 64 through the opening 66. In the embodiment shown, the outer portion 74 surrounds and is threadingly engaged to the outer end 48 of the link rod 40, and the abutment portion 72 is defined by an annular flange extending from the outer portion 74 away from the outer end 48.

The outer locking member 70 includes an abutment portion 76 which is larger than the bracket opening 66 such that it cannot pass therethrough. The abutment portion 76 of the outer locking member 70 is located radially outwardly of the engagement wall 64. In a particular embodiment, the outer locking member 70 is completely located radially outwardly of the engagement wall 64. In the embodiment shown, the outer locking member 70 includes an outer portion 78 surrounding and threadingly engaged to the outer end 48 of the link rod 40. The abutment portion 76 of the outer locking member 70 is annular and extends radially inwardly from the outer portion 78, around and spaced apart from the outer end 48 of the link rod 40, such that an annular space is defined between the outer end 48 and the abutment portion 76. The annular space is larger than the outer portion 74 of the inner locking member 68, and the outer portion 74 of the inner locking member 68 is received into the annular space.

The engagement wall 64 is thus compressed between the abutment portions 72, 76 of the locking members 68, 70, such as to lock the position of the link rod 40 and prevent movement in the two opposed directions defined along the length of the link rod 40. In a particular embodiment, this allows the link rod 40 to be solicited both in tension and in compression without compromising its position.

In the embodiment shown, the engagement wall 64 is compressed between the abutment portions 72, 76 by the abutment portion 72 of the inner locking member 68 directly abutting an inner surface 80 of the engagement wall 64, and the abutment portion 76 of the outer locking member 70 abutting an outer surface 82 of a locking washer 84 received radially outwardly of and against the engagement wall 64. The locking washer 84 engages the outer portion 74 of the inner locking member 68 to prevent rotation of the inner locking member 68. A locking washer 86 and retaining ring 88 may also be provided around the outer portion 78 of the outer locking member 70 to prevent its rotation.

The outer portion 74 of the inner locking member 68 protrudes radially outwardly beyond the outer surface 82, and the connecting assembly 38 is configured such that the outer surface 82 is accessible from the outside of the bypass duct wall 24. Accordingly, the position of the inner locking member 68 may be adjusted from outside of the bypass duct wall 24 through manipulation of its protruding outer portion 74.

It is understood that the inner surface and/or outer surface which are contacted by the abutment portions 72, 76 may be defined by other element(s) of the connecting assembly 38. For example, the outer surface may be defined by the engagement wall 64 and/or the inner surface may be defined by another element in contact with the engagement wall 64.

In another embodiment, the locking members 68, 70 lock the position of the link rod 40 and prevent movement in the two opposed directions defined along the length of the link rod 40 without compressing a same element therebetween; the inner surface and/or other surface which are contacted by the abutment portions 72, 76 may be defined by different elements of the connecting assemblies 38, for example, separate walls of the bracket 50.

Figure 6:
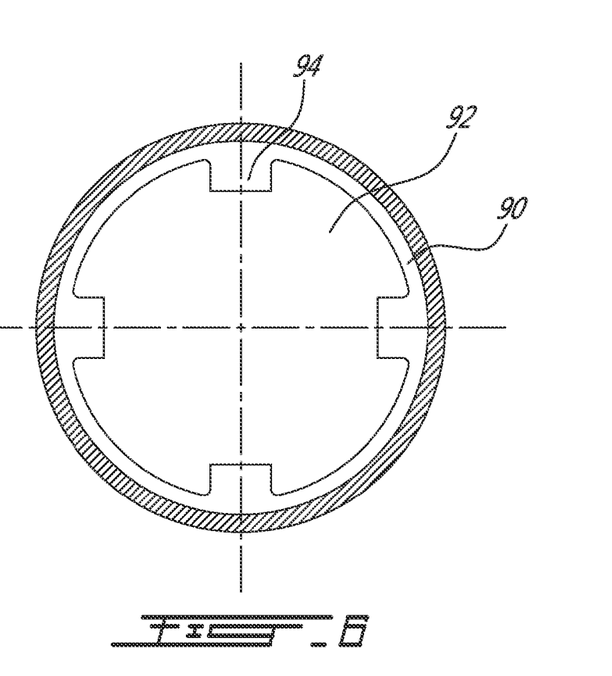
FIG. 6 is a schematic cross-sectional view taken along line 6-6 of FIG. 4, in accordance with a particular embodiment.
Figure 7:
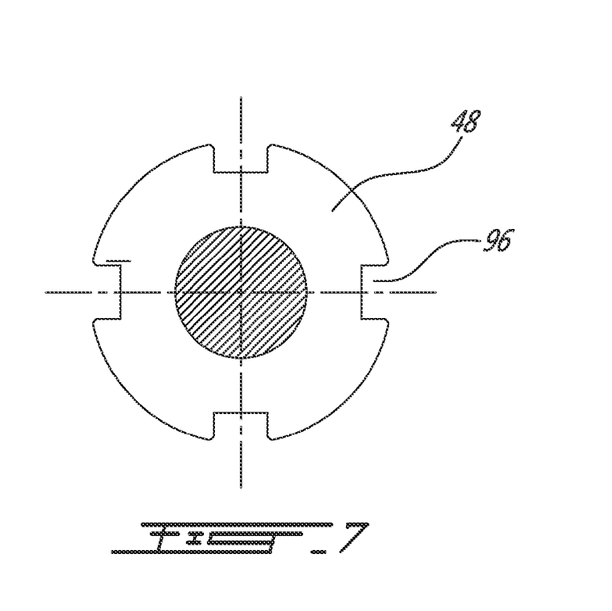
FIG. 7 is a schematic cross-sectional view taken along line 7-7 of FIG. 4, in accordance with a particular embodiment.

The bracket 50 and the outer end 48 of the link rod 40 may include complementary anti-rotation features in engagement with one another. In the embodiment shown and with reference to FIGS. 4, 6 and 7, the bracket 50 includes a locking wall 90 extending radially inwardly of and parallel to each engagement wall 64. The locking wall 90 is connected to the engagement wall 64, and has an opening 92 defined therethrough in alignment with the opening 66 of the engagement wall 64 for receiving the outer end 48 of the link rod 40 therethrough. As can be seen in FIG. 6, the locking wall 90 includes tabs 94 protruding into the opening 92. As can be seen in FIG. 7, the outer end 48 of the link rod 40 includes slots 96 complementary to the tabs 94. Accordingly, the tabs 94 are received in the slots 96 to prevent rotation of the link rod 40 with respect to the bracket 50.

Although in the embodiment shown, each bracket 50 defines two engagement walls 64 each engaging the outer end 48 of a respective link rod 40, with the two openings 66 being axially aligned and circumferentially spaced apart, it is understood that in another embodiment, each link rod 40 may be engaged to a respective bracket, such that each bracket includes a single engagement wall and opening.

In the embodiment shown, the outer end 48 of each link rod 40 includes a clevis 98 engaging the remainder of the link rod 40, the remainder of the link rod 40 and clevis 98 having aligned holes defined therethrough through which a bolt 100 is received to define a pivot connection. Other types of connections and other configurations are also possible.

The core portion 20 and bypass duct wall 24 may be interconnected in accordance with the following. The inner end 44 of each link rod 40 is connected to the core portion 20 and the respective inner locking member 68 is engaged to the outer end 48 of each link rod 40. The inner locking member 68 may be engaged to the link rod 40 either before or after the link rod 40 is connected to the core portion 20.

The core portion 20 is inserted within the bypass duct wall 24 and the outer end 48 of each link rod 40 is passed through the respective bracket opening 66 from the inside of the bypass duct wall 24. The inner locking member 68 is positioned such that its outer portion 74 protrudes radially outwardly from the opening 66. As the inner locking member 68 engages the opening 66 from the inside, its abutment portion 72 remains radially inward of the engagement wall 64.

The protruding outer portion 74 of each inner locking member 68 is grabbed from outside of the bypass duct wall 24, for example by a suitable tool, and the position of the inner locking member 68 of each link rod 40 is adjusted until the abutment portion 72 abuts the inner surface 80 and the core portion 20 has the desired position within the bypass duct wall 24. In the particular embodiment shown where the inner locking member 68 and outer end 48 of the link rod 40 are threadingly engaged, the adjustment is performed through rotation of the inner locking member 68 by engagement of its outer portion 74, for example with the suitable tool. The position of the inner locking members 68 is thus adjusted from outside of the bypass duct wall 24.

Once the inner locking member 68 of each link rod 40 is properly positioned, the outer locking member 70 is engaged to the outer end 48 of the link rod 40, again from outside of the bypass duct wall 24. Each outer locking member 70 is moved radially inwardly until it abuts the outer surface 82. In the particular embodiment shown where the outer locking member 70 and outer end 48 of the link rod 40 are threadingly engaged, the adjustment is performed through rotation of the outer locking member 70 by engagement thereof, for example with a suitable tool.

The position of the locking members 68, 70 is locked by any type of suitable system or engagement. In the particular embodiment shown, the position of each inner locking member 68 is locked through the threaded engagement and further secured through engagement of the locking washer 84 in a complementary slot defined in an outer surface of the outer portion 74 of the inner locking member 68, to prevent rotation of the inner locking member 68. The locking washer 84 rests against the engagement wall 64 and defines the outer surface 82 against which the outer locking member 70 abuts. Accordingly the abutting outer locking member 70 presses the locking washer 84 against the engagement wall 64 and secures its position, thus the position of the inner locking member 68. The second locking washer 86 is inserted in engagement with the outer locking member 70 and the outer end 48 of the link rod 40 to further secure the position of the outer locking member 70. The retaining ring 88 is also installed around the outer portion 78 of the outer locking member 70.

The inner locking member 68 thus prevents a radially outward movement of the link rod 40 through its abutment with the inner surface 80 of the connecting assembly 38, while the outer locking member 70 prevents a radially inward movement of the link rod 40 through its abutment with the outer surface 82 of the connecting assembly 38.

The protruding outer portion 74 of the inner locking member 68 and the outer locking member 70 being both accessible from outside of the bypass duct wall 24, in a particular embodiment, the position of the core portion 20 is adjusted when required during the life of the engine 10 from outside of the bypass duct wall 24, by removing the outer locking members 70 from outside of the bypass duct wall 24, adjusting the position of the inner locking members 68 from outside of the bypass duct wall 24 by manipulation of their outer portion 74 to obtain the desired position of the core portion 20, and re-engaging the outer locking members 70 from outside of the bypass duct wall 24 once the desired position is obtained.

The above description is meant to be exemplary only, and one skilled in the art will recognize that changes may be made to the embodiments described without departing from the scope of the invention disclosed. Modifications other than those described which fall within the scope of the present invention will be apparent to those skilled in the art, in light of a review of this disclosure, and such modifications are intended to fall within the appended claims.

The invention claimed is:

1. A gas turbine engine comprising:
   a core portion received within an annular bypass duct wall, a bypass air passage being defined by an annular space between the core portion and bypass duct wall;
   a front mount assembly supporting the core portion in proximity of an inlet of the bypass air passage;
   a rear mount assembly supporting the core portion in proximity of an outlet of the bypass air passage, the rear mount assembly including:
      a plurality of link rods interconnecting the bypass duct wall and the core portion to form a load transfer path therebetween;
      a plurality of connecting assemblies, each connecting assembly being connected to the bypass duct wall, each connecting assembly having:
         an inner surface facing radially inwardly and an outer surface located radially outwardly of the inner surface and facing radially outwardly, both the inner and outer surfaces bordering an opening through which an outer end of a respective one of the link rods extends, the outer surface being accessible from outside of the bypass duct wall,
         a first locking member engaged to the outer end in a first locked position, the first locking member including a first abutment portion located radially inwardly of the inner surface and abutting the inner surface, the first locking member having an outer portion protruding radially outwardly through the opening beyond the outer surface, and
         a second locking member engaged to the outer end in a second locked position, the second locking member having a second abutment portion located radially outwardly of the outer surface and abutting the outer surface.

2. The gas turbine engine as defined in claim 1, wherein the plurality of link rods interconnect the bypass duct wall and a mid-turbine frame of the core portion.

3. The gas turbine engine as defined in claim 1, wherein the second abutment portion is annular, the outer portion of the first locking member extending within the second abutment portion.

4. The gas turbine engine as defined in claim 1, wherein the first and second locking members are threadingly engaged to the outer end of the respective one of the link rods.

5. The gas turbine engine as defined in claim 1, wherein each of the connecting assemblies includes a bracket received in a hole defined through the bypass duct wall and connected to the bypass duct wall, the bracket having an engagement wall defining the opening through which the outer end of the respective one of the link rods extends, the engagement wall being compressed between the first and second abutment portions.

6. The gas turbine engine as defined in claim 5, wherein the engagement wall defines the inner surface, the outer surface being defined by a locking washer received radially outwardly of and against the engagement wall, the locking washer engaging the outer portion of the first locking member.

7. The gas turbine engine as defined in claim 5, wherein the bracket and the outer end of the respective one of the link rods include complementary anti-rotation features in engagement with one another.

8. The gas turbine engine as defined in claim 5, wherein the engagement wall is a first engagement wall and the opening is a first opening, the bracket having a second engagement wall having a different orientation than that of the first engagement wall, the second engagement wall having a second opening defined therethrough, an outer end of another one of the link rods extending through the second opening, the connecting assembly further comprising:
   a third locking member engaged to the outer end of the other one of the link rods in a third locked position, the third locking member including a third abutment portion located radially inwardly of the second engagement wall, the third locking member having an outer portion protruding radially outwardly through the second opening beyond the second engagement wall; and
   a fourth locking member engaged to the outer end of the other one of the link rods in a fourth locked position, the fourth locking member having a fourth abutment portion located radially outwardly of the second engagement wall;
   wherein the second engagement wall is compressed between the third and fourth abutment portions.

9. The gas turbine engine as defined in claim 8, wherein the first and second engagement walls are interconnected between the first and second openings, the first and second openings being aligned along an axial direction of the engine and being circumferentially spaced apart.

10. A rear mount assembly for a gas turbine engine, the assembly comprising:
    a plurality of connecting assemblies each including a bracket sized to be received in a respective one of a plurality of holes defined through a bypass duct wall of the gas turbine engine, each bracket including an engagement wall having an opening defined therethrough;
    for each bracket, a first link rod having an outer end received through the opening, the first link rod extending radially inwardly from the bracket; and
    each of the connecting assemblies including:
       a first locking member engaged to the outer end of the first link rod, the first locking member having a first abutment portion located radially inwardly of the engagement wall, the first abutment portion abutting an inner surface of the connecting assembly to prevent a radially outward movement of the outer end, the first locking member having an outer portion protruding radially outwardly of the engagement wall through the opening; and a second locking member engaged to the outer end, the second locking member having a second abutment portion located radially outwardly of the engagement wall, the second abutment portion abutting an outer surface of the connecting assembly to prevent a radially inward movement of the outer end.

11. The assembly as defined in claim 10, wherein the inner surface is defined by the engagement wall, the first abutment portion abutting the inner surface.

12. The assembly as defined in claim 10, wherein the outer surface is defined by a locking washer received radially outwardly of and against the engagement wall, the locking washer engaging the outer portion of the first locking member.

13. The assembly as defined in claim 10, wherein the first and second locking members are threadingly engaged to the outer end of the first link rod.

14. The assembly as defined in claim 10, wherein the second abutment portion is annular, the outer portion of the first locking member extending within the second abutment portion.

15. The assembly as defined in claim 10, wherein opening is a first opening, the bracket further including a locking wall located radially inwardly of the engagement wall, the locking wall having a second opening defined therethrough in alignment with the first opening, the outer end of the first link rod extending through the second opening, and wherein the bracket and the outer end include complementary anti-rotation features in engagement with one another, the anti-rotation features of the bracket being defined in the locking wall around the second opening.

16. The assembly as defined in claim 10, wherein the engagement wall is a first engagement wall, the opening is a first opening, the inner surface is a first inner surface, and the outer surface is a first outer surface, each of the brackets including a second engagement wall having a second opening defined therethrough, the assembly further comprising:
for each of the brackets, a second link rod having an outer end received through the second opening, the second link rod extending radially inwardly from the bracket with a different orientation than the first link rod; and
for each second link rod:
a third locking member engaged to the outer end of the second link rod, the third locking member having a third abutment portion located radially inwardly of the second engagement wall, the third abutment portion abutting a second inner surface of the connecting assembly to prevent a radially outward movement of the outer end of the second link rod, the third locking member having an outer portion protruding radially outwardly of the second engagement wall through the second opening; and
a fourth locking member engaged to the outer end of the second link rod, the fourth locking member having a fourth abutment portion located radially outwardly of the second engagement wall, the fourth abutment portion abutting a second outer surface of the connecting assembly to prevent a radially inward movement of the outer end of the second link rod.

17. The assembly as defined in claim 16, wherein the first and second engagement walls are interconnected between the first and second openings.

18. A method of supporting a core portion within a bypass duct wall of a gas turbine engine, the method comprising:
engaging an inner end of each of a plurality of link rods to the core portion and engaging a first locking member to an outer end of each of the link rods;
inserting the outer end of each of the link rods through a respective opening of a connecting assembly of the bypass duct wall from inside of the bypass duct wall, the first locking member having an abutment portion larger than the respective opening and an outer portion protruding radially outwardly from the respective opening;
from outside of the bypass duct wall, manipulating each first locking member by the outer portion to adjust a position of each first locking member until the abutment portion of each first locking member abuts an inner surface of the connecting assembly defined around the respective opening and the core portion has a desired position within the bypass duct wall, and locking the position of the first locking member; and
from outside of the bypass duct wall, engaging a second locking member to the outer end of each of the link rods and moving each second locking member radially inwardly until each second locking member abuts an outer surface of the connecting assembly defined around the respective opening, and locking a position of the second locking member.

19. The method as defined in claim 18, wherein adjusting the position of each first locking member includes moving the first locking member along a threaded engagement between the first locking member and the outer end of a respective one of the link rods, and moving each second locking member includes moving the second locking member along a threaded engagement between the second locking member and the outer end.

20. The method as defined in claim 19, wherein locking the position of the first locking member includes engaging a locking washer to the first locking member, the outer surface abutting the second locking member being defined by the locking washer.

* * * * *